United States Patent
Hanke et al.

[11] 3,744,598
[45] July 10, 1973

[54] INSTALLATION FOR THE UNLOADING OF SHAFT SEALS IN HYDRODYNAMIC BRAKES FOR VEHICLES, ESPECIALLY FOR MOTOR VEHICLES

[75] Inventors: Hans Hanke; Friedrich Bultmann, both of Stuttgart, Germany

[73] Assignee: Daimler-Benz Aktiengesellschaft, Stuttgart-Untertuerkheim, Germany

[22] Filed: Apr. 6, 1971

[21] Appl. No.: 131,680

[30] Foreign Application Priority Data
Apr. 8, 1970 Germany.................. P 20 16 711.7

[52] U.S. Cl............................... 188/296, 188/290
[51] Int. Cl............................................ F16d 57/04
[58] Field of Search........................... 188/290, 296; 277/59; 60/54; 415/112

[56] References Cited
UNITED STATES PATENTS

| | | | |
|---|---|---|---|
| 2,889,013 | 6/1959 | Schneider...................... | 188/296 X |
| 568,045 | 9/1896 | Sendtner...................... | 188/290 X |
| 3,639,008 | 2/1972 | MacDuff...................... | 303/10 |
| 1,737,870 | 12/1929 | Telfer...................... | 415/112 |
| 3,146,863 | 9/1964 | Herbenar et al............... | 188/290 X |

*Primary Examiner*—George E. A. Halvosa
*Attorney*—Craig, Antonelli & Hill

[57] ABSTRACT

An installation for the relief and protection of oil-retaining rings or other shaft seals in hydrodynamic brakes for vehicles, in which at least one fixed blade wheel and one rotating blade wheel are provided in the brake, and in which the working circulatory system is filled with a pressure medium during the actuation of the vehicle brake; the space sealed off by the oil seal is relieved directly in front of the oil seal toward a place of the working circulatory system that becomes pressureless during operation and is also connected with a device opposing actuation of the vehicle brake when the vehicle stands still.

15 Claims, 1 Drawing Figure

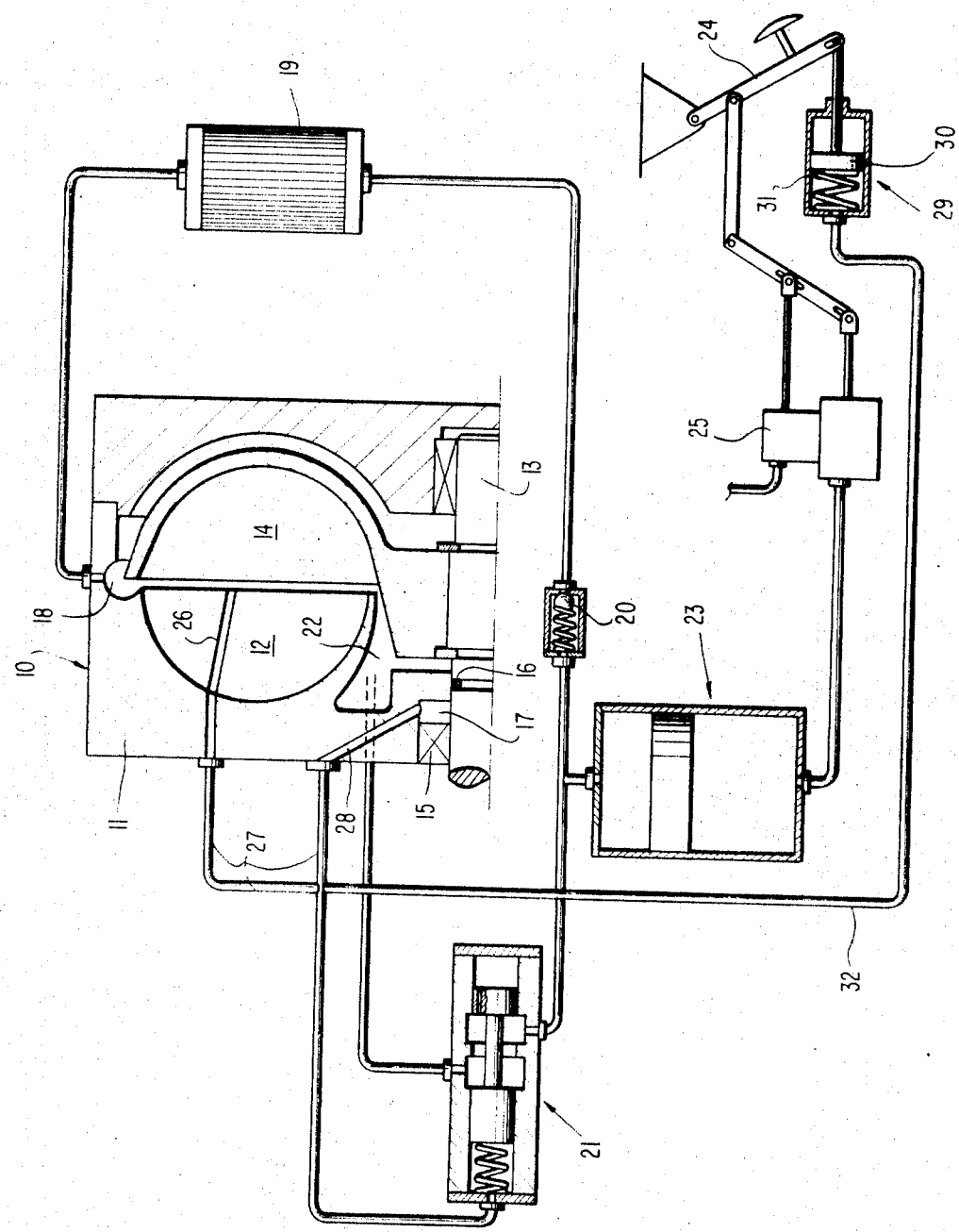

INSTALLATION FOR THE UNLOADING OF SHAFT SEALS IN HYDRODYNAMIC BRAKES FOR VEHICLES, ESPECIALLY FOR MOTOR VEHICLES

The present invention relates to an installation for the relief and protection of oil seals or other shaft seals in hydrodynamic brakes (retarders) for vehicles, especially for motor vehicles, which include at least one fixed and one rotating blade wheel and whose working circulatory system is filled during the actuation of the vehicle brake.

In retarders of the aforementioned type, a relatively high pressure normally prevails in the working circulatory system, and more particularly at the inlet or outlet thereof. As a result thereof, there exists the danger that the shaft seals become leaky prematurely and considerable leakage losses may arise. Additionally, almost always such types of retarders are controlled by the brake pedal of the vehicle. Hence, there also exists the danger that the shaft seals at the retarder are pushed through, so to speak of, in case of an unintentional or a testing actuation of the brake pedal when the vehicle stands still.

The present invention is concerned with the task to provide a solution to the aforementioned problems. The underlying problems are solved according to the present invention with the installation of the type described above in that the sealed-off space directly in front of the shaft seal is exhausted or relieved toward a place of the working circulatory system that is pressureless in operation, and is connected with a blocking means at the actuating member of the vehicle brake.

The installation according to the present invention offers the advantage that during the operation, i.e., with a rotating retarder, a relief or exhaust of the shaft seal, for example, of the oil seals or retaining rings, takes place. On the other hand, when the vehicle stands still and the brake pedal is actuated, the pressure produced thereat is transmitted back to the brake pedal by way of the blocking device so that a considerably larger force acts thereat which at least calls to the attention of the driver the non-permissiveness of such an actuation, or even possibly prevents the same.

The present invention prefers a solution according to which a further seal is connected in front of the shaft seal, for example, of the oil seal or retaining ring, and whereby the space disposed between the two seals serves as relief space. In this manner, the relief or exhaust can be constituted even more effectively.

In particular, it is proposed according to the present invention that a bore is extended in the housing of the hydrodynamic brake to the core of the working circulatory system and that this bore, on the other hand, is in communication with the relief space directly in front of the shaft seal or between the two seals. These connecting lines may be represented appropriately by housing bores.

According to the present invention, a servo-cylinder actuated by a pressure medium is coordinated to the brake pedal, whose piston engages at the pedal and whose cylinder space is in communication with the relief space in front of the shaft seal or with the line between the shaft seal and the bore leading to the core in the working circulatory system. The pressure building-up in the stationary retarder during an unintentional actuation of the brake pedal is thereby transmitted back to the servo-cylinder which, as a result thereof, renders difficult an actuation of the brake pedal or even prevents such actuation.

Accordingly, it is an object of the present invention to provide an installation for the relief of shaft seals in hydrodynamic brakes for vehicles which obviates the shortcomings and drawbacks encountered in the prior art.

Another object of the present invention resides in an installation for relieving shaft seals in hydrodynamic brakes for vehicles which minimizes the danger of premature leaks and therewith undesirable leakage losses.

A further object of the present invention resides in an installation for the relief of shaft seals in hydrodynamic brakes for vehicles which opposes the actuation of the brake when the vehicle stands still.

Still a further object of the present inventon resides in a hydrodynamic brake for motor vehicles which is simple in construction, reliable in operation and effectively achieves all of the aforementioned aims and objects.

These and other objects, features and advantages of the present invention will become more obvious from the following description when taken in connection with the accompanying drawing which shows, for purposes of illustration only, one embodiment in accordance with the present invention, and wherein:

The single FIGURE is a schematic view of an installation for relieving the shaft seal of a hydrodynamic brake in accordance with the present invention.

Referring now to the single FIGURE of the drawing, reference numeral 10 generally designates therein a retarder which includes a fixed blade wheel 12 formed by the housing 11 and a rotating blade wheel 14 driven by the drive shaft 13 of the vehicle. The shaft 13 is sealed with respect to the housing 11 by a shaft seal 15, for example, by an oil seal of conventional construction. Furthermore, a second seal 16, for example, in the form of a piston ring, is provided, so that a space 17 is disposed between the two seals 15 and 16 which is provided for the relief to be described more fully hereinafter.

The retarder 10 is arranged in an external circulation which leads from the retarder outlet 18 by way of a cooler 19, a check valve 20, and a disengaging valve generally designated by reference numeral 21 to the retarder inlet 22. A filling cylinder generally designated by reference numeral 23 is connected with this external circulatory system which is put under pressure by a brake valve 25 actuated by a brake pedal 24.

A bore 26 is cast into a blade in the fixed blade wheel 12, which leads to the core space of the retarder 10, which is pressureless in the operation thereof or within which prevails a vacuum during operation. This bore 26 is connected by way of a line 27 or by way of a corresponding housing bore, with a line 28, which leads directly into the space 17 in front of the oil seal 15. During the operation of the retarder, this space 17 therefore becomes pressureless or evacuated, i.e., sucked empty, so to speak of, with a vacuum existing in the core ring of the retarder.

Insofar as the seal 16 permits the escape of pressure oil, the latter is conducted back into the core ring of the retarder and the oil seal 15 is therefore relieved of pressure. A servo-cylinder generally designated by reference numeral 29 is coordinated to the brake pedal 24, whose piston 30 engages at the brake pedal 24. The space 31 of the servo-cylinder 29 is connected by way of a line 32 with the connecting line 27, i.e., also with the core ring of the retarder. If now the brake pedal 24 is actuated while the vehicle stands still and if now the retarder 10 is actuated with pressure by the filling cylinder 23, then this pressure continues also in the manner described by way of the bore 26 into the connecting line 27 and therewith by way of the line 32 into the space 31 of the servo-cylinder 29. As a result thereof, a further movement of the brake pedal 24 is made difficult or, under certain circumstances, even prevented. It is impossible in this manner that for example, due to lack of attention or inadvertence, the oil seal 15 is pushed out.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A hydrodynamic brake installation comprising:
 a brake housing,
 at least one fixed blade wheel and one rotatable blade wheel arranged in spaced facing relationship to one another in said housing,
 a working fluid circulatory system for supplying working fluid to a working chamber formed between said fixed and rotatable blade wheels to effect braking of a shaft connected to said rotatable blade wheel,
 a brake actuating member for controlling said supply of working fluid to said working chamber,
 a shaft seal interposed between said housing and said shaft to limit escape of working fluid from said housing along said shaft,
 first conduit means for directly communicating the core of said working chamber with a seal space between said housing and said shaft which is sealed off by the shaft seal such that the low pressure experienced at said core during supply of working fluid with a rapidly rotating shaft relieves said shaft seal, pressure responsive brake actuating opposing means connected to said brake actuating member,
 and second conduit means directly communicating the pressure of said working fluid in said working chamber to said brake actuating opposing means,
 said brake actuating opposing means including means for automatically opposing the operation of said brake actuating member in response to predetermined high pressures communicated by said second conduit means, whereby an excessive pressure build-up in said seal space resulting from working fluid leakage between said housing and said shaft is automatically limited by the automatic retardation of the operation of said brake actuating member in response to said predetermined high pressures occurring in said working chamber during supply of working fluid with other than a rapidly rotating shaft.

2. An installation according to claim 1, characterized in that a bore leads within the housing toward the core of the working chamber, and in that this bore, on the other hand, is in operative connection with a seal space directly in front of the shaft seal.

3. An installation according to claim 1, characterized in that said brake actuating opposing means includes a servo-cylinder means coordinated to a brake pedal of said brake actuating member, the servo-cylinder means including a piston engaging at the brake pedal and a cylinder space operatively connected with at least one of the two parts consisting of said seal space and of a line between the seal space and a bore leading to the core of the working chamber.

4. An installation according to claim 1, characterized in that the shaft seal is an oil seal.

5. An installation according to claim 4, characterized in that said oil seal is a retaining ring.

6. An installation according to claim 1, wherein at least one of said first and second conduit means directly communicate with a piston of a disengaging valve of said circulatory system.

7. An installation according to claim 6, wherein both of said first and second conduit means communicate directly with said disengaging valve of said circulatory system.

8. An installation according to claim 1, characterized in that a further seal means is connected ahead of the shaft seal and the space disposed between the two seals serves as said seal space.

9. An installation according to claim 8, characterized in that a bore leads within the housing of said hydrodynamic brake toward the core of the working chamber, and in that this bore, on the other hand, is in operative connection with the seal space directly in front of the shaft seal.

10. An installation according to claim 9, characterized in that said brake actuating opposing means includes a servo-cylinder means coordinated to a brake pedal of said brake actuating member, the servo-cylinder means including a piston engaging at the brake pedal and a cylinder space operatively connected with at least one of the two parts consisting of said seal space and of a line between the seal space and the bore leading to the core of the working chamber.

11. An installation according to claim 1, wherein said first conduit means includes a bore through a portion of said housing which opens into said seal space.

12. An installation according to claim 11, wherein said first conduit means further includes a bore through a portion of said housing and said fixed blade wheel which opens into said working chamber at a position in said fixed blade wheel in facing relationship to said rotatable blade wheel.

13. An installation according to claim 12, wherein said first conduit means further includes a line arranged outside of said housing and connecting said last two mentioned bores with one another.

14. An installation according to claim 12, wherein said last-mentioned bore forms part of said second conduit means.

15. An installation according to claim 13, wherein said line forms part of said second conduit means.

* * * * *